(12) United States Patent
Rappitsch et al.

(10) Patent No.: US 11,143,349 B2
(45) Date of Patent: Oct. 12, 2021

(54) SHROUDED PIPE

(71) Applicant: AIRBUS OPERATIONS GMBH, Hamburg (DE)

(72) Inventors: Michael Rappitsch, Hamburg (DE); Konrad Rauch, Augsburg (DE); Jens Döring, Munich (DE); Dirk Friedewald-Witte, Warstein (DE)

(73) Assignee: Airbus Operations GmbH, Hamburg (DE)

( * ) Notice: Subject to any disclaimer, the term of this patent is extended or adjusted under 35 U.S.C. 154(b) by 754 days.

(21) Appl. No.: 15/600,146

(22) Filed: May 19, 2017

(65) Prior Publication Data

US 2017/0336007 A1 Nov. 23, 2017

(30) Foreign Application Priority Data

May 20, 2016 (EP) ..................................... 16170733

(51) Int. Cl.
*F16L 39/00* (2006.01)
*F16L 9/18* (2006.01)
(Continued)

(52) U.S. Cl.
CPC .......... *F16L 39/005* (2013.01); *B64D 37/005* (2013.01); *F16L 9/18* (2013.01); *F16L 9/19* (2013.01)

(58) Field of Classification Search
CPC .. F16L 39/005; F16L 9/18; F16L 9/19; B64D 37/005
See application file for complete search history.

(56) References Cited

U.S. PATENT DOCUMENTS

| 724,675 A | 4/1903 | Decker |
| 2,756,032 A | 7/1956 | Dowell |
| (Continued) | | |

FOREIGN PATENT DOCUMENTS

| DE | 102005059089 A1 | 6/2007 |
| EP | 2589787 A1 | 5/2013 |
| (Continued) | | |

OTHER PUBLICATIONS

Non-Final Office Action for U.S. Appl. No. 15/600,122 dated Jan. 30, 2019.

(Continued)

*Primary Examiner* — Zachary T Dragicevich
*Assistant Examiner* — Fannie C Kee
(74) *Attorney, Agent, or Firm* — Jenkins, Wilson, Taylor & Hunt, P.A.

(57) ABSTRACT

A shrouded pipe formed from inner and outer pipe sections, the inner pipe section having an outwardly projecting flange joining the outer pipe section, and the outer pipe section having an inwardly projecting flange joining the inner pipe section, an annular volume between the inner and outer pipe sections providing a secondary fluid path. The flanges control axial position of the inner pipe section. By providing one flange which extends radially outwardly and one which extends radially inwardly, assembly is possible of the shrouded pipe by inserting the inner pipe section into the outer pipe section, without modification of the outer pipe section or inner pipe section. The first and second flanges ensure no unwanted contact between the inner and outer pipe sections and, therefore, prevent damage to the primary fluid path. The first and second flanges ensure good load distribution between the inner and outer pipe sections.

20 Claims, 6 Drawing Sheets

(51) Int. Cl.
  *F16L 9/19* (2006.01)
  *B64D 37/00* (2006.01)

(56) References Cited

U.S. PATENT DOCUMENTS

| | | | |
|---|---|---|---|
| 3,068,026 A * | 12/1962 | McKamey | F16L 59/065 |
| | | | 285/47 |
| 5,277,455 A * | 1/1994 | Graves | F16L 23/167 |
| | | | 285/123.1 |
| 5,497,809 A | 3/1996 | Wolf | |
| 6,880,581 B1 | 4/2005 | Weeks | |
| 7,451,541 B2 | 11/2008 | Stastny et al. | |
| 8,267,433 B2 | 9/2012 | Lange et al. | |
| 8,844,598 B2 * | 9/2014 | Andersson | F16L 39/005 |
| | | | 156/499 |
| 10,006,568 B2 | 6/2018 | Callaghan et al. | |
| 10,520,116 B2 | 12/2019 | Rappitsch et al. | |
| 2004/0026922 A1 | 2/2004 | Carns et al. | |
| 2007/0012818 A1 | 1/2007 | Miyazawa et al. | |
| 2010/0230953 A1 | 9/2010 | Baylot et al. | |
| 2010/0282353 A1 | 11/2010 | Baylot et al. | |
| 2013/0087238 A1 | 4/2013 | Mercier | |
| 2013/0312865 A1 | 11/2013 | Baur et al. | |
| 2015/0285421 A1 * | 10/2015 | Bleyer | F16L 39/005 |
| | | | 285/123.15 |
| 2015/0369400 A1 | 12/2015 | Dill | |
| 2017/0335997 A1 | 11/2017 | Rappitsch et al. | |

FOREIGN PATENT DOCUMENTS

| | | | | |
|---|---|---|---|---|
| EP | 2927471 A1 | 10/2015 | | |
| EP | 3246610 A1 | 11/2017 | | |
| EP | 3246610 B1 | 7/2019 | | |
| FR | 2712065 A1 | 5/1995 | | |
| FR | 2735085 A1 * | 12/1996 | | F16L 55/00 |
| FR | 2927398 A1 * | 8/2009 | | F16L 39/005 |
| WO | WO 99/34141 A1 | 7/1999 | | |

OTHER PUBLICATIONS

European Office Action for Application No. 16170733.6 dated Sep. 26, 2019.
Non-Final Office Action for U.S. Appl. No. 15/600,122 dated September 7, 2018.
Notice of Allowance for U.S. Appl. No. 15/600,122 dated Aug. 28, 2019.
Extended European Search Report for Application No. 16170733 dated Nov. 7, 2016.
Extended European Search Report for U.S. Appl. No. 16/170,735 dated Nov. 7, 2016.
Final Office Action for U.S. Appl. No. 15/600,122 dated Jun. 13, 2019.
European Office Action for Application No. 16170733.6 dated Mar. 15, 2019.

* cited by examiner

FIG. 5

SHROUDED PIPE

CROSS-REFERENCE TO RELATED APPLICATION

This application claims priority to European Patent Application EP 16 170 733.6 filed May 20, 2016, the entire disclosure of which is incorporated by reference herein.

TECHNICAL FIELD

The present disclosure relates to a method for producing a shrouded pipe and a shrouded pipe assembly produced by such a method, in particular a shrouded pipe assembly for distributing fuel or other fluids within an aircraft.

BACKGROUND

Shrouded pipes have several industrial applications in situations where for example leak containment, protection of primary flow lines from physical damage or control of heat transfer to or from the transported fluid are important. The annular volume between an inner and an outer pipe provides a secondary fluid flow path or alternatively a volume which may be insulated to prevent, or used to ensure, heat transfer from the primary fluid. Shrouded pipes are therefore often employed where for example flammable, toxic, or corrosive fluids are transported, e.g. fuel or chemicals.

It is sometimes necessary for aircraft fuel lines to be shrouded in order to ensure that a leak within the main fuel pipe is contained by the shrouding. Such shrouding is typically mandatory in areas of the aircraft specified by the relevant certifying authority as ignition control zones, for example pressurized areas of the aircraft occupied by crew, passengers or cargo through which fuel lines must pass. In addition, pipes within aircraft may be shrouded in order to provide two fluid flow paths: one within the inner pipe and another in the volume between the inner and outer pipes.

A known shrouded fuel line assembly is disclosed in US2013/0312865A1, which describes a method of forming a double-walled pipe in which two or more channel-like pipe segments are joined together along their longitudinal edge.

SUMMARY

At its most general, the disclosure herein provides a shrouded pipe formed from inner and outer pipe sections, the inner pipe section having an outwardly projecting flange joining the outer pipe section, and the outer pipe section having an inwardly projecting flange joining the inner pipe section, an annular volume between the inner and outer pipe sections providing a secondary fluid path.

A first aspect of the disclosure herein provides a method for producing a shrouded pipe comprising an inner pipe section and an outer pipe section, the inner pipe section and the outer pipe section each having a first end and a second end, the inner pipe section having a first flange projecting radially outwardly from the first end thereof and the outer pipe section having a second flange projecting radially inwardly from the second end thereof, the method comprising the steps of: enclosing the inner pipe section within the outer pipe section, whereby the inner pipe section is for providing a primary fluid path; and joining the first flange of the inner pipe section to the first end of the outer pipe section and joining the second flange of the outer pipe section to the second end of the inner pipe section, to thereby define an annular volume between the inner and outer pipe sections for providing a secondary fluid path.

In the prior art shrouded pipe arrangement shown in US2013/0312865, it is necessary to assemble the inner and outer pipe sections together by splitting the outer pipe section along its length. A set of spacers is required to ensure that the two pipe sections are arranged coaxially.

In contrast, the first and second flanges of the present disclosure serve to control the axial position of the inner pipe section relative to the outer pipe section. Moreover, by providing one flange which extends radially outwardly (the first flange) and one which extends radially inwardly (the second flange), it is possible to assemble the shrouded pipe by inserting the inner pipe section into the outer pipe section, without any modification of the outer pipe section (or inner pipe section) being necessary. That is, the second end of the inner pipe section can pass freely through the outer pipe section because it does not carry either the first or second flange. The final assembly position is achieved when the second end of the inner pipe section abuts the second flange, and the first flange abuts the first end of the outer pipe section.

Thus, the step of enclosing the inner pipe section within the outer pipe section may include inserting the second end of the inner pipe section into the first end of the outer pipe section and moving the inner pipe section relative to the outer pipe section towards the second end of the outer pipe section until the second end of the inner pipe section abuts the second flange and the first flange abuts the first end of the outer pipe section.

The first and second flanges serve to ensure that there is no unwanted contact between the inner and outer pipe sections (i.e. contact that bridges the secondary fluid flow path), and therefore to prevent damage to the primary fluid path. Moreover, the first and second flanges ensure good load distribution between the inner and outer pipe sections, particularly of bending loads applied to the shrouded pipe.

The inner pipe section and outer pipe section may be curved such that they have a common curved longitudinal axis.

Manufacture of curved shrouded pipes is complicated since the inner pipe section must be located within the outer pipe section and the relative axial positions of the two parts must be controlled. In some prior art arrangements straight inner and outer pipe sections are assembled together and subsequently bent using a cold forming technique. Such processes are difficult to control, and lead to the possibility of undesirable contact between the inner and outer pipe sections along the secondary flow path. The bending process also potentially introduces areas of structural weakness into the pipe sections. In US2013/0312865 the use of cold bending techniques is avoided by splitting and re-joining the outer pipe section, but this solution is time-consuming and still results in the potential for structural weakness at the joins.

The first flange may be integrally formed with the inner pipe section. Alternatively, or in addition, the second flange may be integrally formed with the outer pipe section. Thus, the number of process steps required to form the shrouded pipe is reduced. In addition, integral forming enables accurate positioning of the flange relative to its respective pipe section.

The inner and outer pipe sections may be formed by casting, for example from a metallic material. Casting these parts in their final shape is preferred over known techniques such as cold bending of straight pipe sections because accuracy of the final shape is better controlled and the introduction of structural defects into the parts is minimized.

The step of joining the first flange to the first end of the inner pipe section may include forming a first circumferential joint, such as a first circumferential weld seam. Additionally, or alternatively, the step of joining the second flange to the second end of the outer pipe section includes forming a second circumferential joint, such as a second circumferential weld seam. Such joints provide good protection against leaks, and good load transfer across the joint. Moreover, the parts can be joined with high accuracy and precision.

A second aspect of the disclosure herein provides a shrouded pipe assembly having an inner pipe section for providing a primary fluid path and an outer pipe section enclosing the inner pipe section, the inner pipe section having a first flange projecting radially outwardly from a first end thereof, and the outer pipe section having a second flange projecting radially inwardly from a second end thereof, wherein the first flange is joined to a first end of the outer pipe section and the second flange is joined to a second end of the inner pipe section to thereby define an annular volume between the inner and outer pipe sections for providing a secondary fluid path.

As described above in relation to the first aspect, the first and second flanges of the present disclosure serve to control the axial position of the inner pipe section relative to the outer pipe section. Moreover, by providing one flange which extends radially outwardly (the first flange) and one which extends radially inwardly (the second flange), it is possible to assemble the shrouded pipe by inserting the inner pipe section into the outer pipe section, without any modification of the outer pipe section (or inner pipe section) being necessary. That is, the second end of the inner pipe section can pass freely through the outer pipe section because it does not carry either the first or second flange. The final assembly position is achieved when the second end of the inner pipe section abuts the second flange, and the first flange abuts the first end of the outer pipe section.

The first and second flanges serve to ensure that there is no unwanted contact between the inner and outer pipe sections (i.e. contact that bridges the secondary fluid flow path), and therefore to prevent damage to the primary fluid path. Moreover, the first and second flanges ensure good load distribution between the inner and outer pipe sections, particularly of bending loads applied to the shrouded pipe.

The inner and outer pipe sections may be curved such that they share a common curved longitudinal axis.

Manufacture of curved shrouded pipes is complicated since the inner pipe section must be located within the outer pipe section and the relative axial positions of the two parts must be controlled. In some prior art arrangements straight inner and outer pipe sections are assembled together and subsequently bent using a cold forming technique. Such processes are difficult to control, and lead to the possibility of undesirable contact between the inner and outer pipe sections along the secondary flow path. The bending process also potentially introduces areas of structural weakness into the pipe sections. In US2013/0312865 the use of cold bending techniques is avoided by splitting and re-joining the outer pipe section, but this solution is time-consuming and still results in the potential for structural weakness at the joins.

One or both of the first flange and second flange may comprise a continuous annular flange. The flange may extend across the full radial extent of the secondary fluid path around the circumference, or may extend across its full radial extent at one or more circumferential portions such that the periphery of the flange is scalloped, notched or otherwise non-circular.

The first flange may be joined to the first end of the outer pipe section by a first circumferential joint, the second flange may be joined to the second end of the inner pipe section by a second circumferential joint, and the first and second circumferential joints may comprise circumferential weld seams. Such joints provide good protection against leaks, and good load transfer across the joint. Moreover, the parts can be joined with high accuracy and precision.

In embodiment one or both of the first flange and second flange comprises one or more openings arranged to permit fluid flow from the secondary fluid path. Thus, fluid flowing through the secondary fluid path (e.g. leaked fluid diverted from the primary fluid path) can be drained away. Moreover, when the shrouded pipe is assembled in a pipe system with other shrouded pipes the openings can enable a continuous secondary fluid path to be created, with fluid flowing from the secondary fluid path of one shrouded pipe to the secondary fluid path of the neighboring shrouded pipe. The openings may comprise closed holes through the flange, or notches or other open holes at a periphery of the flange.

A third aspect of the disclosure herein provides an aircraft fuel system comprising a shrouded pipe according to the second aspect.

The aircraft fuel system may comprise a pair of shrouded pipe assemblies according to the second aspect, wherein the first flange or second flange of one of the pair of the shrouded pipe assemblies extends between the secondary fluid path of that shrouded pipe assembly and the secondary fluid path of the other of the pair of shrouded pipe assemblies.

The pair of shrouded pipe assemblies are preferably connected together by fasteners passing through first fastening projections extending radially outwardly from the first flange of one of the pair of shrouded pipe assemblies and through second fastening projections extending radially outwardly from the second flange of the other of the pair of shrouded pipe assemblies.

The primary fluid path may be arranged to carry fuel and the secondary fluid path may be arranged to provide one or more of: a fluid path for leaked fuel from the primary fluid path; a fluid path flowing in an opposite direction to the primary fluid path; and a fluid path for increasing or reducing heat exchange to or from the primary fluid path.

The inner and the outer pipe sections may be curved such that they share a common curved longitudinal axis.

Producing a shrouded pipe according to this method has the advantage that it requires only two parts, the inner pipe section and the outer pipe section, one or both of which may have an integral flange. The pipe sections may be cast integral with the flange and any required curve, and may therefore may be made of any materials that allow casting and can be laser welded. For application in aircraft fuel systems, the shrouded pipe may be produced in a lightweight metal or alloy such as titanium or aluminum. The two pipe sections do not generally contact each other during assembly, the only necessary contact between the pipe sections is at the circumferential weld seam or seams. There is therefore a reduced risk of the resulting shrouded pipe having damaged sections, particularly when compared with, for example, a process where the pipe sections may be produced by cold bending a rolled welded or seamless pipe.

The shrouded pipe produced by the method of the present disclosure is therefore designed for strength, durability, and the ability to transfer load along its length and between pipes which may be connected at either end of the shrouded pipe. Both the inner and outer pipe sections are made of materials having the same or similar thermal expansion coefficients in order to prevent thermally induced stresses that could affect load transfer.

BRIEF DESCRIPTION OF THE DRAWINGS

Embodiments of the disclosure herein will now be described with reference to the accompanying drawings, in which.

DETAILED DESCRIPTION

FIGS. 1 through 4 illustrate a shrouded fuel pipe 100 according to a first exemplary embodiment of the disclosure herein. The shrouded pipe 100 comprises an inner pipe section 5 having a generally cylindrical hollow portion 6 which provides a primary fluid path 8 for fuel to flow along the shrouded pipe 100. The cylindrical portion 6 of the inner pipe section 5 is enclosed within, and co-axial with, a corresponding generally cylindrical hollow portion 56 of an outer pipe section 50, to provide an annular volume therebetween, the annular volume providing a secondary fluid flow path 58. The shrouded pipe 100 is bent longitudinally such that its longitudinal axis is curved. In the illustrated embodiments the longitudinal axis is bent through approximately 90 degrees to form an elbow pipe section. In other embodiments the shrouded pipe 100 may be straight, or substantially straight, or have any suitable longitudinal shape.

The secondary fluid path 58 provides a flow path for any fuel which has leaked from a damaged, or otherwise compromised, portion of the primary fluid path 8, thus ensuring that such leaked fuel is retained within the shrouded pipe 100. Alternatively, the secondary fluid path 58 may be a dedicated flow path for fuel or any other fluid. For example, the secondary fluid path may be used to provide fuel flow in the opposite direction to that of the primary fluid path 8, or may be used to provide a flow of a fluid other than fuel. In some embodiments the secondary fluid path 58 may be used to provide a flow of fluid to either enhance or reduce heat transfer to or from the primary fluid path 8.

The outer pipe section 50 thus serves as protection for the primary fluid path 8 as defined by the cylindrical portion of the inner pipe section 5, as well as providing a drain path for any fluid leakage occurring from the inner pipe section 5. Alternatively, the annulus between the inner and outer pipe sections 5, 50 provides a dedicated secondary fluid flow path 58 for fuel or any other fluid. This could be for the purposes of heat transfer and thus temperature control of the primary or secondary path fluid, i.e. as a heat exchanger between the exterior environment and the inner pipe section 5 or for thermal insulation of the inner pipe fluid. Alternatively, the function of the secondary flow path 58 could simply be to transport a second fluid simultaneously, either in the same or opposite direction as the primary flow fluid.

The size of the annular volume between the inner and outer pipe sections 5, 50 is a compromise between the weight of the shrouded pipe and the amount of fluid to be drained or transported. The annulus is designed to ensure that fluid in the secondary flow path 58 has enough to space to flow without exerting pressure on the walls of the pipe sections 5, 50, and therefore does not damage the system.

The inner pipe section 5 is integrally formed with a radially outwardly projecting flange 10 at a first end of the cylindrical portion 6. Similarly, the outer pipe section 50 is integrally formed with a radially inwardly projecting flange 60 at a second end of its respective cylindrical portion 56. The outwardly projecting flange 10 of the inner pipe section 5 extends across the annular volume of the secondary fluid path 58 to provide a connection between the inner and outer pipe sections 5, 50 at a first end of the shrouded pipe 100, as described below. Similarly, the inwardly projecting flange 60 of the outer pipe section 50 extends across the annular volume to provide a connection between the inner and outer pipe sections 5, 50 at a second end of the shrouded pipe 100.

In the illustrated embodiments the outwardly projecting flange 10 and inwardly projecting flange 60 are formed as continuous ring-shaped annular parts which extend across the full radial extent of the annular volume of the secondary fluid path 58. However, in other embodiments these flanges 10, 60 may instead be formed as annular parts which extend across the full radial extent of the annular volume around only a portion, or several portions, of their circumference. That is, the outer edge of the flanges 10, 60 may have a scalloped, or notched, shape. Alternatively, these flanges 10, 60 may be each formed from a plurality of separate radially projecting members distributed around the circumference of the pipe 100.

Figure 1:
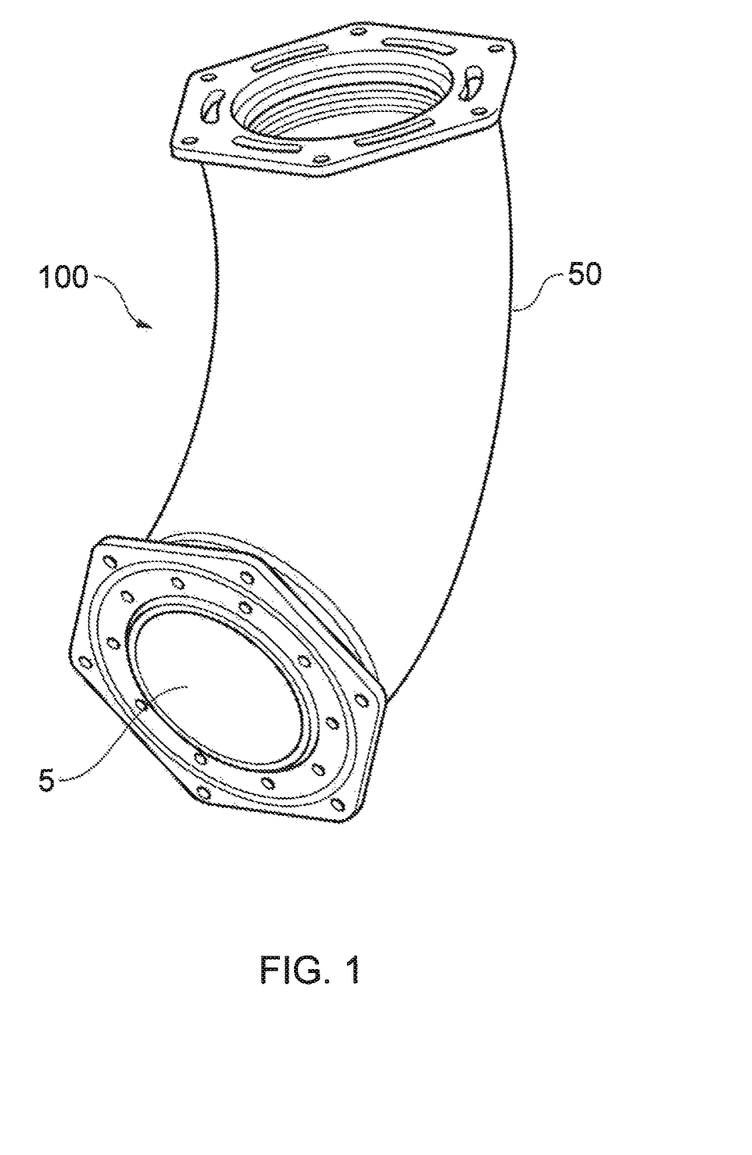
FIG. 1 shows an isometric view of an assembled shrouded pipe according to an embodiment of the disclosure herein.
Figure 2:
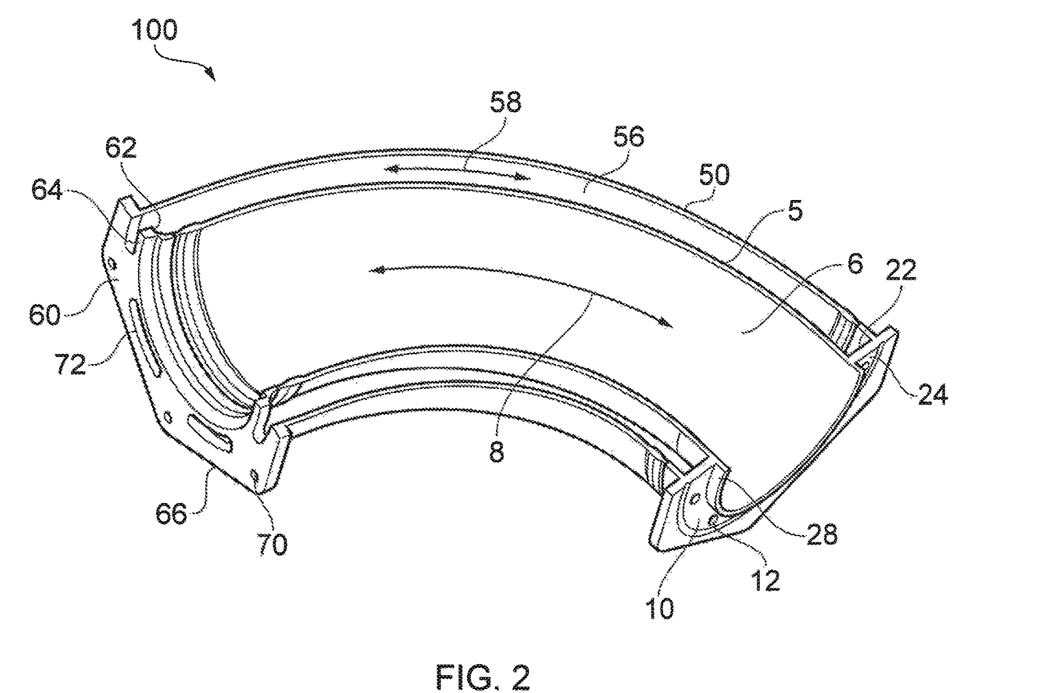
FIG. 2 shows a longitudinal cross-sectional view through an assembled shrouded pipe according to an embodiment of the disclosure herein.
Figure 3A:
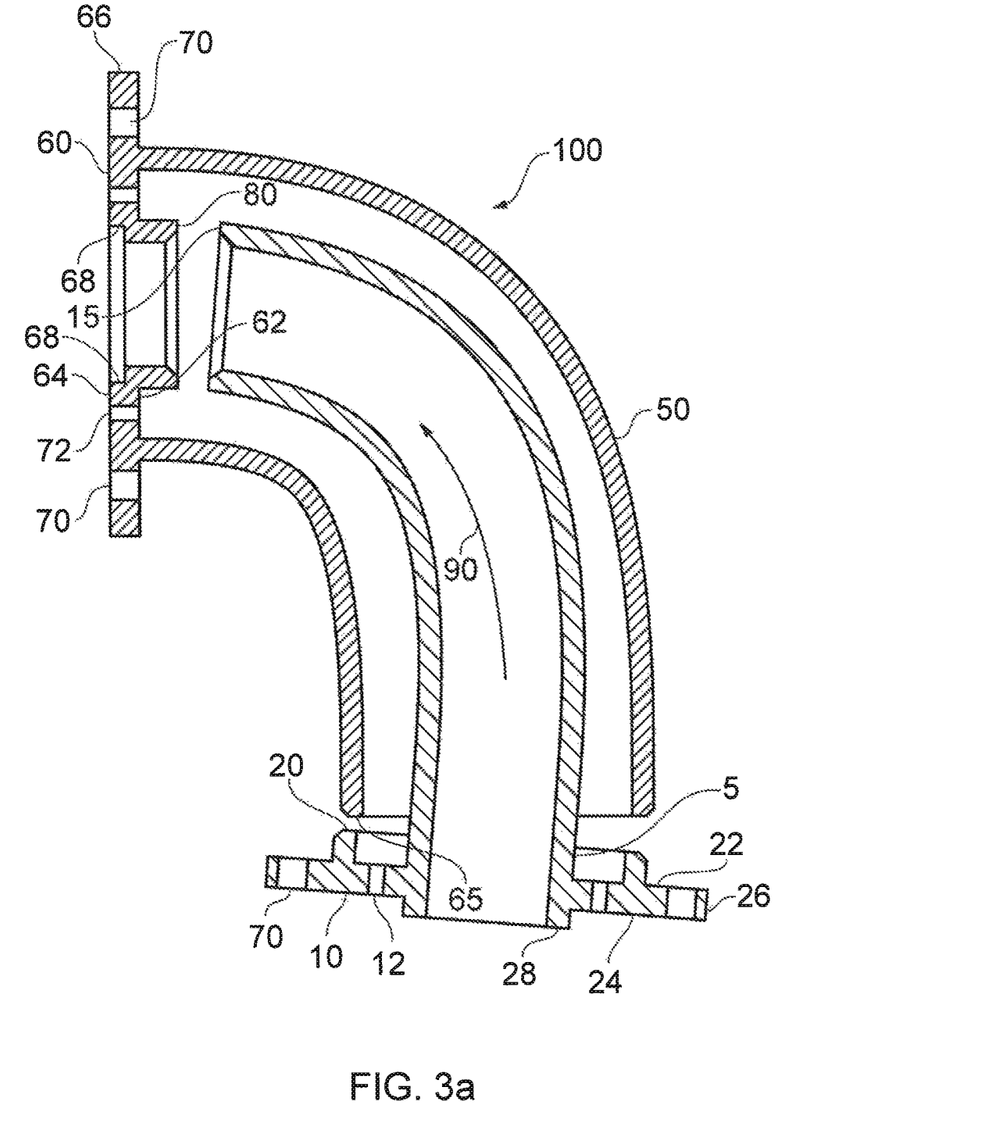
FIG. 3a shows a longitudinal cross section schematically illustrating the inner and outer pipe sections of the pipe of FIG. 2 in a part assembled state.
Figure 3B:
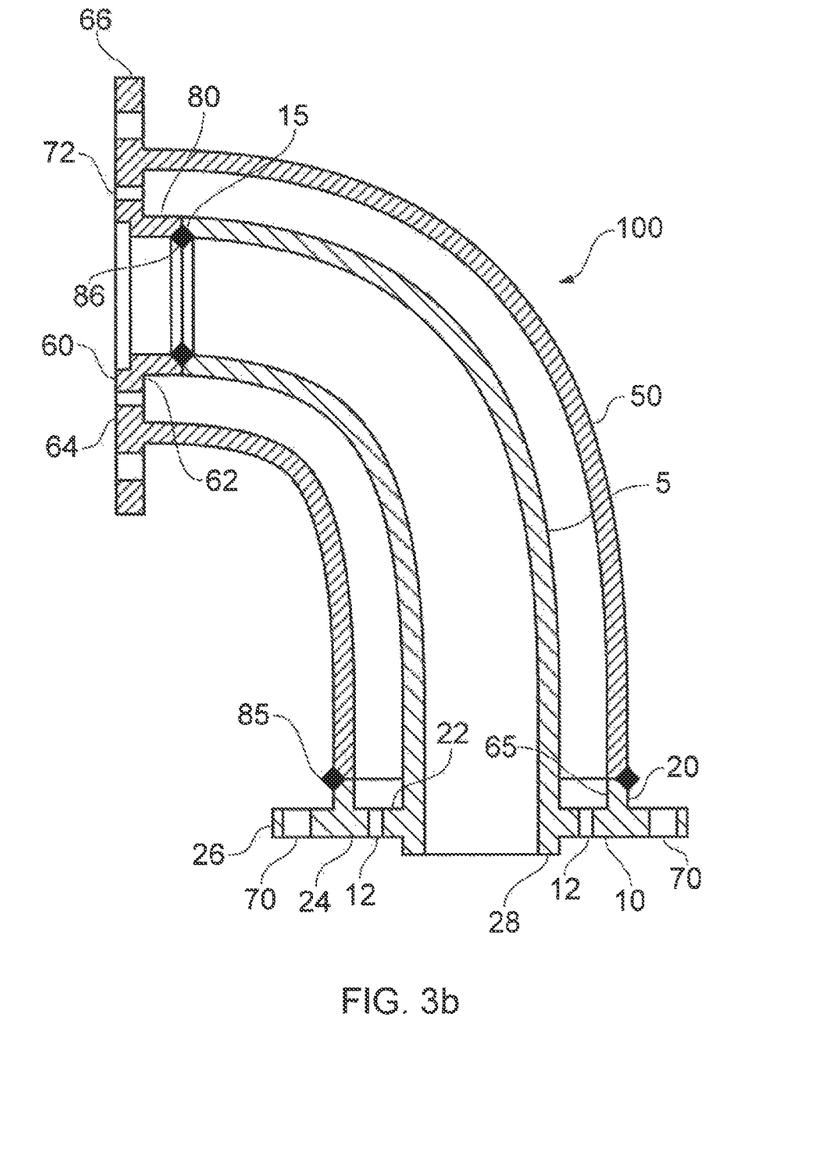
FIG. 3b shows a longitudinal cross section schematically illustrating the assembled shrouded pipe of FIG. 2.
Figure 4A:
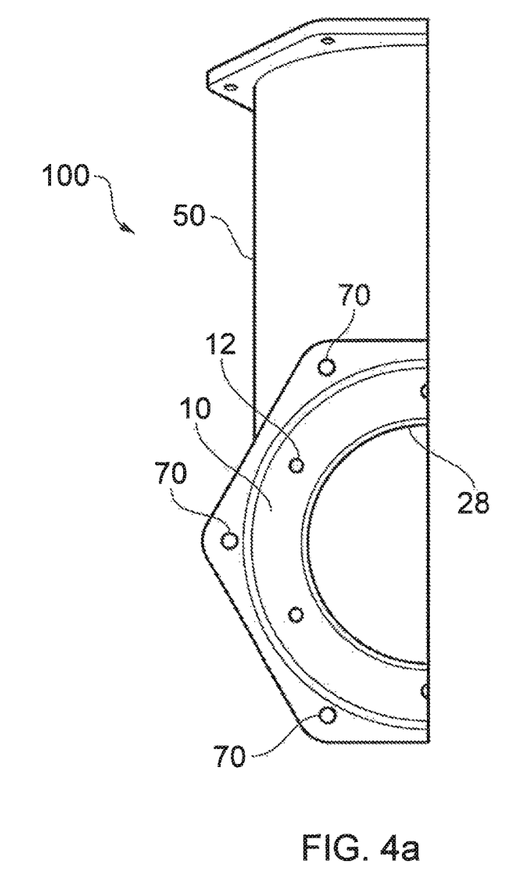
FIGS. 4a and 4b show bisected end views of the outer and inner pipe sections, respectively, of the pipe of FIG. 2.
Figure 4B:
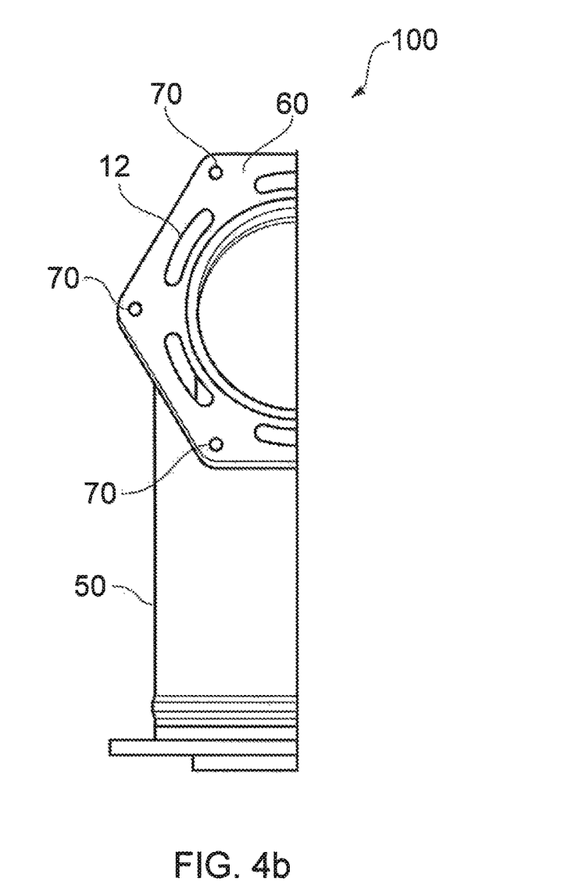

The outwardly projecting flange 10 of the inner pipe section 5 has an inner face 22 which provides an end boundary of the annular volume of the secondary fluid path 58, and an outer face 24 opposed to the inner face 22. The connection between the outwardly projecting flange 10 of the inner pipe section 5 and the outer pipe section 50 is provided by an abutment between the inner face 22 and an annular end face 65 of the outer pipe section 50 at the first end of the shrouded pipe 10, as shown in FIGS. 3a and 3b. The abutment provides a circumferential contact between the flange 10 and the outer pipe section 50 to enable the joint to be joined via a circumferential weld seam 85, as shown in FIG. 3b and described further below. The weld seam 85 may be formed by any suitable welding method, such as orbital welding.

In the illustrated embodiments the end face 65 of the outer pipe section 50 abuts an annular grow-out portion 20 of the inner face 22 of the inner pipe section 5. The annular grow-out portion 20 extends axially from the inner face 22 towards the second end of the shrouded pipe 100, and provides an axial offset between the circumferential weld seam and a joint with another pipe (not shown) in which the outer face 24 of the outwardly projecting flange 10 is in mating contact with a flange of the another pipe.

The inner pipe section 5 also comprises a connection protrusion 26 which projects radially outwardly from, and is axially aligned with, the outwardly extending flange 10. The connection protrusion 26 extends around the circumference of the pipe 100 and provides a way which the pipe 100 may be fastened to further pipes or further components in a system. In the embodiment illustrated in FIGS. 1 through 4, the connection protrusion has a generally hexagonal shape, with a mounting hole 70 suitable for a bolt to pass through at each corner projection such that there are six mounting holes 70 in total. In other embodiments the connection protrusion 26 may have any other suitable shape, such as a circular or annular shape, or may comprise a plurality of separate circumferentially distributed projecting members.

The outwardly projecting flange 10 has openings 12 extending therethrough, which provide an onwards secondary flow channel between the assembled shrouded pipe and subsequent pipes in the system (not shown). That is, the openings 12 enable fluid flow out of the secondary fluid flow path 58 of the shrouded pipe 100. In the illustrated embodiment, the openings 12 are circular and spaced equidistantly around the circumference of the flange 10. In other embodiments, the openings 12 may, for example, be elongated slots or have any shape and position necessary to facilitate the required secondary flow performance. The openings 12 may be spaced to provide a greater number of holes at certain positions around the circumference. For example, in use it may be preferable for a greater number of openings to be positioned towards the lower part of the circumference of the pipe if the secondary flow fluid typically flows at that location due to gravity. It is envisaged that the openings may have a minimum diameter of 6 mm in aircraft fuel system applications.

In other embodiments the openings 12 may be formed as notches or other cut-outs at the periphery of the flange 10 (for example, in embodiments in which the outwardly projecting flange 10 is formed as an annular part which extends across the full radial extent of the annular volume of the secondary fluid path 58 only around one or more portions of its circumference), or as spaces between neighboring separate radially projecting members which together form the flange 10. That is, the openings 12 need not be formed as closed holes as illustrated in the figures.

Figure 5:
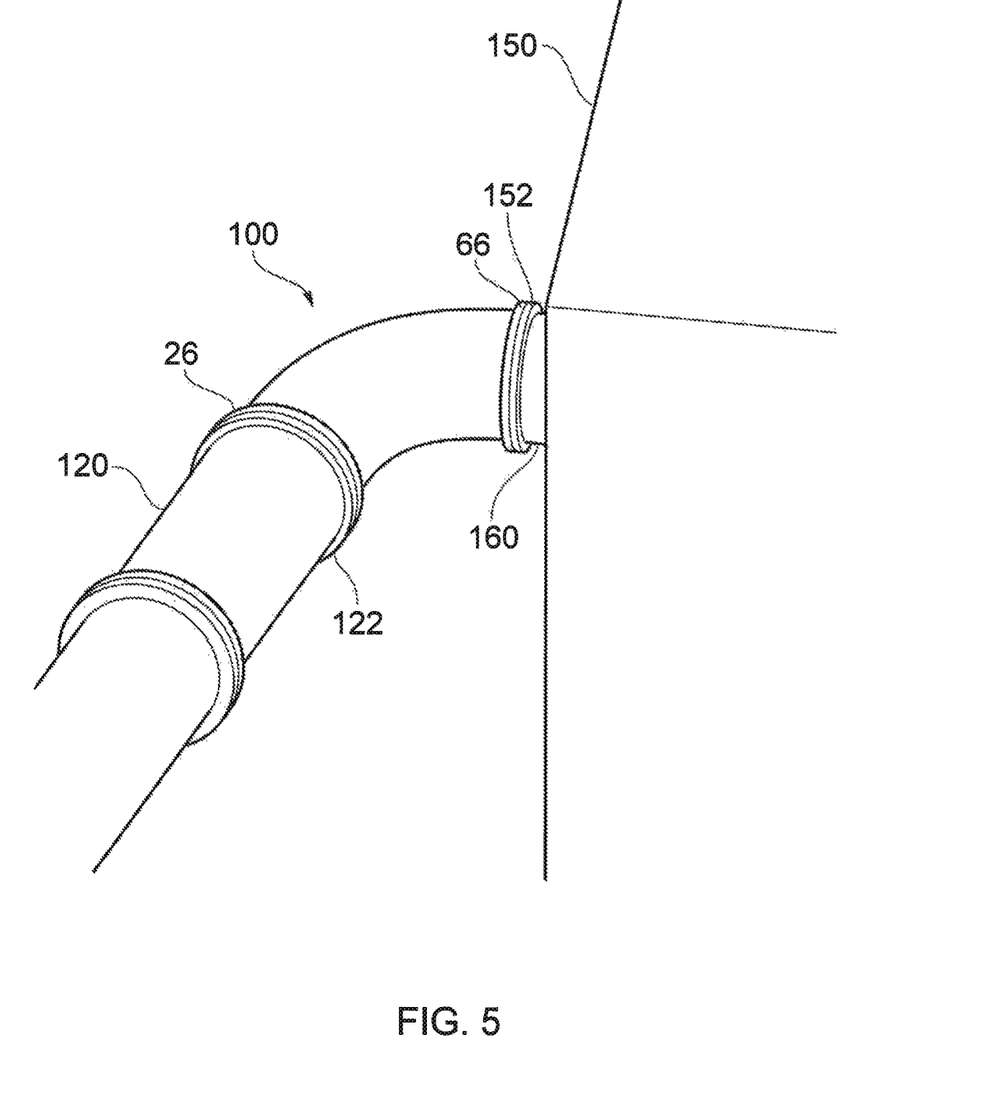
FIG. 5 shows an aircraft fuel assembly comprising a shrouded fuel pipe according to an embodiment of the disclosure herein.

The outwardly projecting flange 10 also has an annular projection 28 projecting axially in the opposite direction to the inner pipe section 5 (i.e. away from the second end of the pipe 100) and extending around the circumference of the pipe 100. On connection of the shrouded pipe 100 with another pipe, as shown in FIG. 5, the annular projection 28 is inserted into a corresponding recess of that pipe to provide a way of ensuring the correct axial alignment between the pipes.

The inwardly projecting flange 60 of the outer pipe section 50 has an inner face 62 providing an end boundary of the annular volume of the secondary fluid path 58 and an outer face 64 opposed to the inner face 62. The connection between the inwardly projecting flange 60 of the outer pipe section 50 and the inner pipe section 5 is provided by an abutment between the inner face 62 and an annular end face 15 of the inner pipe section 5 at the second end of the shrouded pipe 100, as shown in FIGS. 3a and 3b. The abutment provides a circumferential contact between the flange 60 and the inner pipe section 5 to enable the joint to be joined by a circumferential weld seam 86, as shown in FIG. 3b and described further below. The weld seam 86 may be formed by any suitable welding method, such as orbital welding.

In the illustrated embodiments the annular end face 15 of the inner pipe section 5 abuts an annular grow-out portion 80 of the inner face 62 of the inwardly extending flange 60. The annular grow-out portion 80 extends axially from the inner face 62 towards the first end of the shrouded pipe 100, and provides an axial offset between the circumferential weld seam 86 and a joint with another pipe (not shown) in which the outer face 64 of the inwardly projecting flange 60 is in mating contact with a flange of that pipe.

The outer pipe section 50 also comprises a connection protrusion 66 which projects radially outwardly from, and is axially aligned with, the inwardly extending flange 60. The connection protrusion 66 extends around the circumference of the pipe 100 and provides a way by which the pipe 100 may be fastened to further pipes or further components in a system. In the embodiment illustrated in FIGS. 1 through 4, the connection protrusion has a generally annular shape with a hexagonal peripheral edge, with a mounting hole 70 suitable for a bolt to pass through at each corner projection. In other embodiments the connection protrusion 66 may have any other suitable shape, such as a circular or annular shape, or may comprise a plurality of separate circumferentially distributed projecting members.

At its inner opening, the inwardly projecting flange 60 may be shaped so as to receive an annular projection 28 of a further attaching pipe section to provide an engaging fit. Thus, the inwardly projecting flange 60 may be provided with a circumferential notch 68 within which the annular projection 28 of a neighboring shrouded pipe 100 may be seated to provide relative axial and radial location of the pipes.

Like the outwardly projecting flange 10, the inwardly projecting flange 60 has openings 72 extending therethrough to provide an onwards secondary flow channel between the assembled shrouded pipe and subsequent pipes in the system (not shown). That is, the openings 72 enable fluid flow out of the secondary fluid flow path 58 of the shrouded pipe 100. In this embodiment, the openings 72 are slot-shaped and spaced equidistantly around the circumference of the flange 60 such that the longitudinal axes of the slots lie on a circle. In other embodiments, the openings 72 may, for example, be circular, like those of the outwardly projecting flange 10, or have any other shape and position necessary to facilitate the required secondary flow performance. The openings 72 may be spaced to provide a greater number of holes at certain positions around the circumference. For example, in use it may be preferable for a greater number of openings to be positioned towards the lower part of the circumference of the pipe if the secondary flow fluid typically flows at that location due to gravity. It is envisaged that the openings may have a minimum diameter of 6 mm in aircraft fuel system application.

In other embodiments the openings 72 may be formed as notches or other cutouts at the periphery of the flange 60 (for example, in embodiments in which the outwardly projecting flange 60 is formed as an annular part which extends across the full radial extent of the annular volume of the secondary fluid path 58 only around one or more portions in its circumference), or as spaces between neighboring separate radially projecting members which together provide the flange 60. That is, the openings 72 need not be formed as closed holes as illustrated in the figures.

The inner and outer pipe sections 5, 50 may be formed by casting. This manufacturing method is particularly advantageous in embodiments, such as those illustrated, in which the shrouded pipe 100 is bent axially. In such embodiments casting has the benefit over prior art methods such as cold bending of straight pipe sections that the risk of introducing defects into the pipe sections during their manufacture is reduced. Cold bending methods may not provide an accurate curved shape, and may therefore lead to situations in which undesirable contact between the inner 5 and outer 50 pipe sections within the secondary fluid path 58 is possible. In contrast, casting can provide accurate curved pipe shapes.

The inwardly projecting flange 60 and the outwardly projecting flange 10 may be formed integrally with their respective inner and outer pipe sections 5, 50, for example by casting a single pipe section including the flange. Alternatively, the respective pipe section may be fabricated by attaching the flange 10, 60 to the respective pipe section 5, 50 prior to assembly, for example, by seam welding circumferentially at a location where the flange 10, 60 meets the cylindrical portion of the pipe section 5, 50. An advantage of integrally forming the flanges with their respective pipes is that the number of manufacturing steps is minimized, and the accuracy of the final shape is easily controlled.

The inner and the outer pipe sections 5, 50 may be made of any material suitable for the application and joining or fabrication method, including metal, metal alloy or plastic. For an aircraft fuel system titanium or aluminum alloys are particularly suitable due to their low weight characteristic relative to other metals such as steel. In preferred embodiments the inner and outer pipe sections 5, 50 are made from either the same material or from materials having substantially the same thermal expansion coefficient, in order to prevent the generation of undesirable stresses within the pipe 100 due to differing rates of thermal expansion.

The method of assembly of a shrouded pipe 100 according to the present disclosure is illustrated schematically in FIGS. 3a and 3b. FIG. 3a shows the shrouded pipe 100 being assembled by enclosing the inner pipe section 5 within the outer pipe section 50. The second end of the inner pipe section 5 is inserted into the first end of the outer pipe section 50 and moved relative to the outer pipe section 50 in the direction illustrated by arrow 90 so that the annular end face 15 of the inner pipe section 5 approaches the inner end face 62 of the inwardly projecting flange 60 of the outer pipe section 50. The final position, as shown in FIG. 3b, is achieved when the annular end face 15 abuts the annular grow-out portion 80 of the inner face 62 of the inwardly extending flange 60, and the annular grow-out portion 20 of the inner face 22 of the outwardly extending flange 10 abuts the annular end face 65 of the inner pipe section 5.

Joints are then formed at these abutment positions. In the illustrated embodiments these joints are provided by circumferential weld seams 85, 86 formed by an orbital welding process, preferably a laser welding process for high accuracy. Whilst the step of enclosing the inner pipe within the outer pipe necessarily occurs before the steps of joining the pipes together, the joints may be formed in any order.

FIG. 5 shows a shrouded pipe 100 formed as a corner, or elbow, bend such that its axis is curved through approximately 90 degrees, and assembled as part of an aircraft fuel system. The system comprises a fuel tank 150 connected at one end of the shrouded pipe 100. The fuel tank has a cylindrical pipe section 160 extending from one of its faces, which may be a shrouded pipe section having an inner and an outer pipe section as described above, or may be a single walled pipe section. The fuel tank pipe section 160 has a radially extending flange 152 with mounting points (not shown) located around its circumference, in order that it may be connected with the shrouded pipe 100 via fastening to the annular connection protrusion 66 thereof. At its other end the shrouded pipe 100 is connected to a further pipe 120 via fastening between the annular connection protrusion 26 of the shrouded pipe and a radially extending flange 122 of the further pipe 120 carrying a plurality of mounting points (not shown). The cylindrical pipe section 160 and further pipe 120 are preferably shrouded pipes having primary and secondary flow paths aligned with, and in fluid communication with, the primary and secondary flow paths 8, 58 of the shrouded pipe 100.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A shrouded pipe assembly comprising:
an inner pipe section comprising a primary fluid path;
a first flange that is directly attached to and projects radially outwardly from a first end of the inner pipe section;
an outer pipe section enclosing the inner pipe section;
a second flange that is directly attached to and projects radially inwardly from a second end of the outer pipe section;
wherein the first end of the inner pipe section is at an opposite end of the shrouded pipe assembly from the second end of the outer pipe section;
wherein the first flange is joined to a first end of the outer pipe section, such that the first flange is directly attached to both the inner pipe section, at the first end of the inner pipe section, and the outer pipe section, at the first end of the outer pipe section, to define a first radial gap between the inner and outer pipe sections at a first end of the shrouded pipe assembly;
wherein the second flange is joined to a second end of the inner pipe section, such that the second flange is directly attached to both the inner pipe section, at the second end of the inner pipe section, and the outer pipe section, at the second end of the outer pipe section, to define a second radial gap between the inner and outer pipe sections at a second end of the shrouded pipe assembly;
wherein an annular volume extends from the first radial gap to the second radial gap, between the inner and outer pipe sections, to provide a secondary fluid path;
wherein the second flange is a continuous annular flange extending radially inwardly from the outer pipe section to have an inner diameter that is a same as, or smaller than, an inner diameter of the inner pipe section; and
wherein the first flange has an inner diameter that is a same as, or smaller than, the inner diameter of the inner pipe section.

2. The shrouded pipe assembly of claim 1, wherein the inner and outer pipe sections are curved, such that the inner and outer pipe sections share a common curved longitudinal axis.

3. The shrouded pipe assembly of claim 1, wherein the first flange and the inner pipe section are cast as a single inner pipe member and/or the second flange and the outer pipe section are cast as a single outer pipe member.

4. The shrouded pipe assembly of claim 3, wherein the first flange extends radially away from the inner pipe section to have a diameter that is a same as, or greater than, a diameter of the outer pipe section, such that the inner pipe section is insertable through the outer pipe section only via the first end of the outer pipe section.

5. The shrouded pipe assembly of claim 1, wherein the first flange is joined to the first end of the outer pipe section by a first circumferential joint and the second flange is joined to the second end of the inner pipe section by a second circumferential joint.

6. The shrouded pipe assembly of claim 5, wherein the first and/or second circumferential joints comprise circumferential weld seams.

7. The shrouded pipe assembly of claim 1, wherein the first flange and/or the second flange comprise one or more openings arranged to permit fluid flow from the secondary fluid path.

8. An aircraft fuel system comprising a shrouded pipe assembly according to claim 1.

9. The aircraft fuel system according to claim 8, wherein the primary fluid path is arranged to carry fuel and the secondary fluid path is arranged to provide one or more of: a fluid path for leaked fuel from the primary fluid path; a fluid path flowing in an opposite direction to the primary fluid path; and a fluid path for increasing or reducing heat exchange to or from the primary fluid path.

10. The aircraft fuel system according to claim 8, wherein the first flange is joined to the first end of the outer pipe section by a first circumferential joint, the second flange is joined to the second end of the inner pipe section by a second circumferential joint, and the first and second circumferential joints comprise circumferential weld seams.

11. The aircraft fuel system according to claim 8, wherein the inner and outer pipe sections are curved, such that the inner and outer pipe sections share a common curved longitudinal axis.

12. An aircraft fuel system comprising a pair of shrouded pipe assemblies according to claim 1, wherein the first flange or second flange of one of the pair of the shrouded pipe assemblies extends between the secondary fluid path of that shrouded pipe assembly and the secondary fluid path of the other of the pair of shrouded pipe assemblies.

13. The aircraft fuel system according to claim 12, wherein the pair of shrouded pipe assemblies are connected together by fasteners passing through first fastening projections extending radially outwardly from the first flange of one of the pair of shrouded pipe assemblies and through second fastening projections extending radially outwardly from the second flange of the other of the pair of shrouded pipe assemblies.

14. The aircraft fuel system according to claim 12, wherein the first flange is joined to the first end of the outer pipe section by a first circumferential joint, the second flange is joined to the second end of the inner pipe section by a second circumferential joint, and the first and second circumferential joints comprise circumferential weld seams.

15. A method for producing a shrouded pipe assembly, the method comprising:
providing an inner pipe section, which comprises a primary fluid path, and a first flange, which is directly attached to and projects radially outwardly from a first end of the inner pipe section;
providing an outer pipe section and a second flange, which is directly attached to and projects radially inwardly from a second end of the outer pipe section;
enclosing the inner pipe section within the outer pipe section;
joining the first flange to the outer pipe section at a first end of the outer pipe section, such that the first flange is directly attached to both the inner pipe section, at the first end of the inner pipe section, and the outer pipe section, at the first end of the outer pipe section, to define a first radial gap between the inner and outer pipe sections at a first end of the shrouded pipe assembly; and
joining the second flange to the inner pipe section at a second end of the inner pipe section, such that the second flange is directly attached to both the inner pipe section, at the second end of the inner pipe section, and the outer pipe section, at the second end of the outer pipe section, to define a second radial gap between the inner and outer pipe sections at a second end of the shrouded pipe assembly;
wherein the first end of the inner pipe section is at an opposite end of the shrouded pipe assembly from the second end of the outer pipe section;
wherein an annular volume extends from the first radial gap to the second radial gap, between the inner and outer pipe sections to provide a secondary fluid path;
wherein the second flange is a continuous annular flange extending radially inwardly from the outer pipe section to have an inner diameter that is a same as, or smaller than, an inner diameter of the inner pipe section; and
wherein the first flange has an inner diameter that is a same as, or smaller than, the inner diameter of the inner pipe section.

16. The method according to claim 15, wherein the inner pipe section and outer pipe section are curved such that the inner and outer pipe sections have a common curved longitudinal axis.

17. The method according to claim 15, wherein enclosing the inner pipe section within the outer pipe section comprises:
inserting the second end of the inner pipe section into the first end of the outer pipe section; and
moving the inner pipe section relative to the outer pipe section towards the second end of the outer pipe section until the second end of the inner pipe section abuts the second flange and the first flange abuts the first end of the outer pipe section.

18. The method according to claim 15, wherein the first flange and the inner pipe section are cast as a single inner pipe member and/or the second flange and the outer pipe section are cast as a single outer pipe member.

19. The method according to claim 15, wherein joining the first flange to the outer pipe section at the first end of the outer pipe section includes forming a first circumferential joint comprising a first circumferential weld seam.

20. The method according to claim 15, wherein joining the second flange to the inner pipe section at the second end of the inner pipe section comprises forming a second circumferential joint comprising a second circumferential weld seam.

* * * * *